ically a linear relation to the amount of water used in the deactivation of the catalyst. As will be described in Example I, it was found that a water concentration of about 0.03 weight percent based on the total feed caused severe deactivation of the catalyst. On the other hand, it was found that a water concentration of about 0.004 weight percent based on the total feed served to significantly prolong the activity of the catalyst.

United States Patent
Sparks

[15] 3,670,030
[45] June 13, 1972

| | | |
|---|---|---|
| [54] | ALKYLATION OF PHENOLIC COMPOUND | |
| [72] | Inventor: | Allen K. Sparks, Des Plaines, Ill. |
| [73] | Assignee: | Universal Oil Products Company, Des Plaines, Ill. |
| [22] | Filed: | Feb. 20, 1970 |
| [21] | Appl. No.: | 13,196 |
| [52] | U.S. Cl. | ...........260/613 D, 260/624 C, 260/613 R, 260/619 F, 260/619 D, 260/609 F, 260/571 |
| [51] | Int. Cl. | ..........C07c 37/14 |
| [58] | Field of Search | ..........260/624 C, 613 D, 613 R, 619 F, 260/619 D, 609 F, 571 |

[56] References Cited

UNITED STATES PATENTS 3,290,389  12/1966  Hahn..........................260/624 C UX

OTHER PUBLICATIONS

Kaiser, Aluminas from Kaiser (Pamphlet) 1965 pages 8 and 9

*Primary Examiner*—Bernard Helfin
*Attorney*—James R. Hoatson, Jr. and Bernard L. Kramer

[57]  ABSTRACT

Water in a controlled concentration is added in the alkylation of a phenolic compound with an olefin in contact with alumina catalyst. This serves to prolong the activity of the catalyst to effect the alkylation reaction and particularly ortho-alkylation.

9 Claims, No Drawings

ALKYLATION OF PHENOLIC COMPOUND

BACKGROUND OF THE INVENTION

The use of alumina catalyst for the alkylation of a phenolic compound with an olefin has been proposed heretofore. The alumina catalyst is of advantage because it effects maximum ortho-alkylation when utilized under particular conditions. The ortho-alkylated products are of special utility as additives to prevent oxidative deterioration of organic substrates.

DESCRIPTION OF THE INVENTION

While the alumina catalyst is of high activity in catalyzing the ortho-alkylation of a phenolic compound with an olefin, it now has been found that the catalyst undergoes rapid deactivation. The deactivation may be compensated for in part by increasing the temperature of alkylation but the deactivation again occurs rapidly. It now has been found that a stable operation is effected when water in a controlled concentration is introduced into the alkylation system.

The phenomenon of the added water in avoiding deactivation of the catalyst is surprising. The exact mechanism is not fully understood. Previously it was believed that the presence of water in the reaction would have an objectionable effect in selectively decreasing the acidity of the alumina catalyst. Also it was believed heretofore that the water may be a contributing factor in the gradual build-up of olefin polymer on the catalyst and thus result in decreased activity. Regardless of the reason for the improved benefits, it now has been found that water in controlled concentrations does result in a stable catalyst for effecting ortho-alkylation.

In one embodiment the present invention relates to an improvement in the alkylation of a phenolic compound with an olefin and particularly a tertiary olefin in contact with alumina catalyst which comprises effecting the alkylation in the presence of added water in controlled concentration.

The water should be in a concentration of from about 500 to about 5,000 and more particularly from about 1,000 to about 3,000 ppm (parts per million) based on the phenolic compound.

The phenolic compound for alkylation includes phenol, naphthol, anthranol and particularly phenolic compounds containing another substituent on the aromatic nucleus. The other substituent may be hydrocarbyl including alkyl, alkaryl, aryl, aralkyl, cycloalkyl, etc. In another embodiment the other substituent may comprise a halogen including chlorine, bromine, fluorine or iodine. Still other phenolic compounds include hydroxy-diphenyl amine, hydroxy-diphenyl ether, hydroxy-diphenyl sulfide, hydroxy-diphenyl methane, hydroxydiphenyl ethane, hydroxy-diphenyl propane, hydroxy-diphenyl butane, etc., corresponding dihydroxy-diphenyl compounds, and similarly substituted naphthols, anthranols, etc.

In a particularly preferred embodiment, the present invention is directed to the alkylation of hydroxyanisole and more specifically p-hydroxyanisole. A very effective antioxidant for animal and vegetable fats and oils is 3-tert-butyl-4-hydroxyanisole which also may be named 2-tert-butyl-4-methoxyphenol. In another embodiment, the alkoxy group may contain from two to about 10 carbon atoms.

In a particularly preferred embodiment the olefin used for alkylation is a tertiary olefin. By tertiary olefin, I mean an olefin in which one or both of the doubly bonded carbon atoms contains two alkyl substituents. Stated in another way, the tertiary olefin is an olefin in which the tertiary carbon atom is a doubly-bonded carbon. The tertiary olefin may be illustrated as containing one or more of the following configurations:

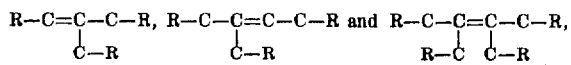

in which the R groups are independently selected from hydrogen and hydrocarbyl groups. The olefin preferably will be selected from isobutylene (2-methylpropylene-1), 2-methylbutylene-1, 2-methylbutylene-2, 2,3-dimethylbutylene-2, 2-methylamylene-1, 2-methylamylene-2, 2,3-dimethylamylene-2, and higher molecular weight tertiary olefins in which one or both of the doubly-bonded carbon atoms is not bonded directly to a hydrogen atom. The tertiary olefin may contain from four to 20 carbon atoms or more.

While a tertiary olefin is particularly preferred for use in the present invention, it is understood that a primary or secondary olefin may be used but not necessarily with equivalent results. The olefin may contain from two to 20 carbon atoms or more. In still another embodiment the olefin may be of even higher molecular weight and comprise a polyolefin which in some cases may contain as much as 50 carbon atoms to the molecule.

The alkylation is effected in the presence of a catalyst consisting of gamma-alumina. Any suitable gamma-alumina may be used, which may be naturally occuring, including gibbsite, bauxite, diaspore, bohemite, etc., generally purified by acid or other treatment and dried and calcined, but preferably is synthetically prepared. The synthetic gamma-alumina is prepared in any suitable manner including the neutralization with an alkaline reagant, such as ammonium hydroxide, sodium hydroxide, potassium hydroxide, etc. of an aluminum salt such as aluminum chloride, aluminum sulfate, aluminum nitrate, etc. or by the acidification of a basic aluminum salt, followed by purification by washing, drying at a temperature of from about 100° to about 400° C. for 0.5 to 24 hours or more and by calcining at a temperature of from about 500° to about 900° C. or more for 0.5 to 12 hours or more. The alumina may be formed into particles of uniform or irregular size and shape in any suitable manner, including extrusion, pelleting, tableting, etc., or the alumina may be ground into powder. In still another embodiment, the alumina may be formed into substantially spherical particles by the conventional oil drop method, spray drying, etc.

While it is preferred that the alumina be substantially free of other components, it is understood that minor concentrations of other components may be tolerated. For example, the alumina may contain a minor proportion of an alkaline component including lithium, strontium, barium, magnesium, etc., preferably in a concentration of not more than about 5 percent by weight of the alumina. In another embodiment, the alumina may contain a minor concentration of halogen and particularly fluorine, as the halide ion, but preferably in a concentration of not greater than about 5 percent and still more preferably not greater than about 3 percent. In still another embodiment, the alumina may contain a small amount of silica which should be below about 15 percent by weight of the alumina. As hereinbefore set forth, there generally is no advantage to these additional components from an operational viewpoint. However, when alumina containing these other components in a small concentration is available and the use thereof is justified for economic reasons, it is not intended to preclude such use in the present invention. It is understood that the use of such catalysts is not necessarily equivalent to the use of a catalyst free of such other components.

As hereinbefore set forth, the alkylation is effected in the presence of added water in a controlled concentration. The water should be in a concentration of from about 500 to about 5,000 ppm and preferably from about 1,000 to about 3,000 ppm based on the phenolic compound. The water may be introduced into the system in any suitable manner and conveniently is injected into the phenolic compound feed. However, when desired, it is understood that the water may be commingled with the olefin or may be introduced directly into the alkylation zone.

The alkylation reaction is effected in any suitable manner and preferably in a continuous type operation in which the catalyst is disposed as a fixed bed in a reaction zone and the reactants and water, at the desired temperature, are passed into contact with the catalyst in either upward or downward flow. Another type of operation is the suspensiod type of operation in which the catalyst is carried into the reaction zone by means of one or more of the reactants or by means of an inert carrying medium. Another type of operation includes the fluidized type process in which the reactants, water and catalyst are maintained in a state of turbulence under hindered settling conditions in the reaction zone.

The alkylation is effected at any suitable temperature and particularly at a temperature of from about 100° to about 200° C. The pressure to be employed will depend upon the type of operation and will vary from atmospheric and preferably from a superatmospheric pressure of from about 100 to about 2,000 psi or more.

The phenolic compound and olefin are reacted in a mole ratio of 1:1. In one embodiment the mole ratio charged is 1:1. In another embodiment it may range up to 20:1 and preferably will be within the range of from 2:1 to 5:1 moles of phenolic compound per mole of olefin. In still another embodiment the olefin may be used in excess to insure total reaction and may be in a ratio up to 5:1 and preferably up to 2.5:1 of olefin to phenolic compound.

The process of the present invention produces high yields of the ortho-alkylated product and, by the improvement of the present invention, results in a stable operation for a long period of time.

The product from the alkylation reaction may be treated in any suitable manner such as by fractionation, solvent extraction, etc. to separate unreacted phenolic compound, which is recycled to the reaction zone for further conversion therein, and the desired alkylated product. It is an important advantage of the present invention that the yield of the ortho-alkylated product is high, with low yields of undesired meta or para-alkylated product or of dialkylated products. The absence of the undesired alkylated products, not only increases the yields of the desired ortho-alkylated product, but also avoids the need for additional separation steps to remove the undesired alkylated products. In most cases there is no need to further process the alkylated product because the product as recovered from the process is of sufficient high purity for its intended use.

The following examples are introduced to illustrate further the novelty and utility of the present invention but not with the intention of unduly limiting the same.

EXAMPLE I

A series of runs were made in which hydroxyanisole was alkylated with isobutylene in the presence of alumina catalyst. These runs were made in a pilot plant in which hydroxyanisole, heated to above its melting point of 127° F., and isobutylene were charged into a heated reaction chamber containing a fixed bed of alumina catalyst. In one set of runs, water was commingled with the hydroxyanisole charge in concentrations ranging from about 1,000 to 3,000 ppm based on the hydroxyanisole. The effluent products from the reaction zone were subsequently passed to a fractionating column, from which unreacted hydroxyanisole was withdrawn as an overhead fraction and recycled to the reaction zone and from which alkylated hydroxyanisole was passed to another fractionating column from which the butylated hydroxyanisole was recovered as an overhead fraction and any higher boiling material was withdrawn as a bottom fraction.

The liquid product was subjected to three different analyses as follows: (1) polarographic analysis for hydroquinone, butylated hydroquinone and dibutylated hydroquinone, (2) GLC (gas liquid chromatographic analyses) for light ends, intermediates, hydroxyanisole, 3-t-butyl-4-hydroxyanisole, 2-t-butyl-4-hydroxyanisole, 2,5- and 3,5-di-t-butyl-4-hydroxyanisole and (3) gas chromatographic analyses on the light ends and intermediates in order to determine the composition thereof. In most cases the desired 3-t-butyl-4-hydroxyanisole comprised over 98 percent of the butylated product and in many cases comprised 100 percent thereof.

The catalyst used in the above series of runs contained 0.5 percent by weight of fluorine as fluoride and the rest comprised substantially gamma-alumina. The catalyst had an ABD of 0.686 and was prepared by the general steps of digesting aluminum metal cuttings with hydrogen chloride to form an alumina sol, then commingling hexamethylene-tetraamine therewith and dropping the sol into an oil bath, wherein the droplets form into spheres, which are aged, washed, dried in a stream of air at about 315° C., contacted with hydrogen fluoride solution and calcined at about 530° C. for about 3 hours.

In one series of runs, effected without the addition of water, using a temperature of about 160° C., a pressure of about 1,000 psi and a hydroxyanisole to isobutylene mole ratio of 1:1, the conversion, measured as percent hydroxyanisole converted, dropped from above 50 percent to 3 percent in 228 hours of operation.

In contrast to the above, another run made in substantially the same manner but with the addition of about 1,000 ppm of water, the conversion remained at about 25 percent after 1,251 hours. Thus it will be seen that the addition of water served to avoid rapid decline in catalyst activity as was experienced in the run made in the absence of water addition. It is readily apparent that stable operation is of great importance in any plant and is a definite improvement in the art.

As hereinbefore set forth the alumina catalyst selectively effects ortho-alkylation and in all of the runs described above, the desired 3-butyl-hydroxyanisole, also named as 2-tertiary-butyl-4-methoxyphenol, was greater than 98 percent and in most cases was above 99 percent of the alkylate product.

EXAMPLE II

In another series of runs similar to those described in the previous example, 10,000 ppm of water was charged to the plant for one 12-hour period. This resulted in a decrease in conversion from above 25 percent down to 17.6 percent. The run was continued with only 2,000 ppm of water being charged and this resulted in a recovery of the conversion to greater than 26 percent. In this particular operation, the concentration of water charged to the plant should be not more than 5,000 ppm and preferably in the range of from 1,000 to 3,000 ppm.

EXAMPLE III

Phenol is subjected to alkylation with isobutylene using gamma-alumina catalyst and added water in a concentration of 1,500 ppm based on the phenol charge. The alkylation is effected at 140° C. and 1,000 psi, utilizing a mole ratio of phenol to isobutylene of 1:1. This results in a stable operation for a long period of time to produce ortho-t-butylphenol.

EXAMPLE IV

Another run is made in substantially the same manner as described in Example III in which m-cresol is alkylated with 2-methylbutene-2 to form high yields of the desired 3,6-di-alkylated product.

I claim as my invention:

1. In the alkylation of a phenolic compound with a tertiary olefinic hydrocarbon in contact with a gamma-alumina catalyst the preparation of which includes the step of calcining at a temperature of from about 500° to about 900° C., the improvement which comprises effecting said alkylation in the presence of added water in a concentration of from about 500 to about 5,000 ppm of said phenolic compound.

2. The process of claim 1 effected at a temperature of from about 100° to about 200° C.

3. The process of claim 1 wherein said phenolic compound is phenol.

4. The process of claim 1 wherein said phenolic compound is hydroxyanisole.

5. The process of claim 4 wherein said olefin is a tertiary olefin.

6. The process of claim 5 wherein said olefin is isobutylene.

7. The process of claim 6 wherein said water is in a concentration of from about 1,000 to about 3,000 ppm of said hydroxyanisole.

8. The process of claim 7 wherein said water is commingled with said hydroxyanisole and charged to the alkylation zone.

9. The process of claim 8 wherein unreacted hydroxyanisole is separated from the products of the alkylation and is recycled to the alkylation zone for further conversion therein.

* * * * *